No. 823,322. PATENTED JUNE 12, 1906.
J. F. DELANY.
APPARATUS FOR SEPARATING AND GRADING GRAIN.
APPLICATION FILED NOV. 15, 1905.
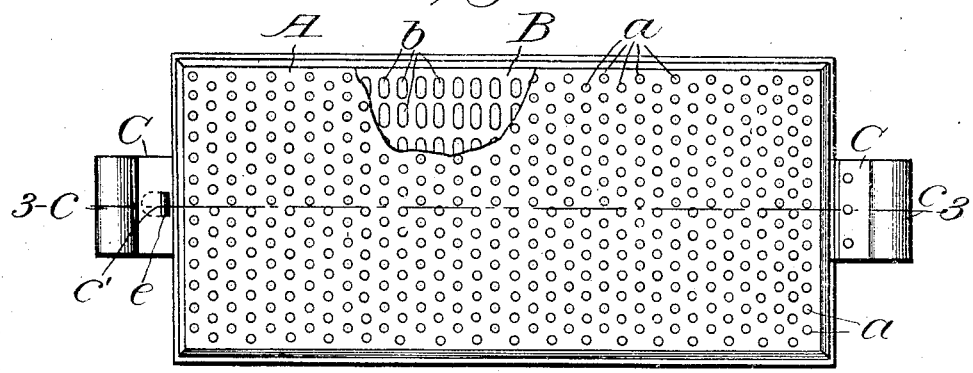
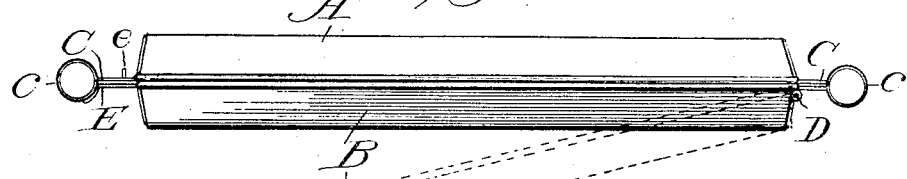
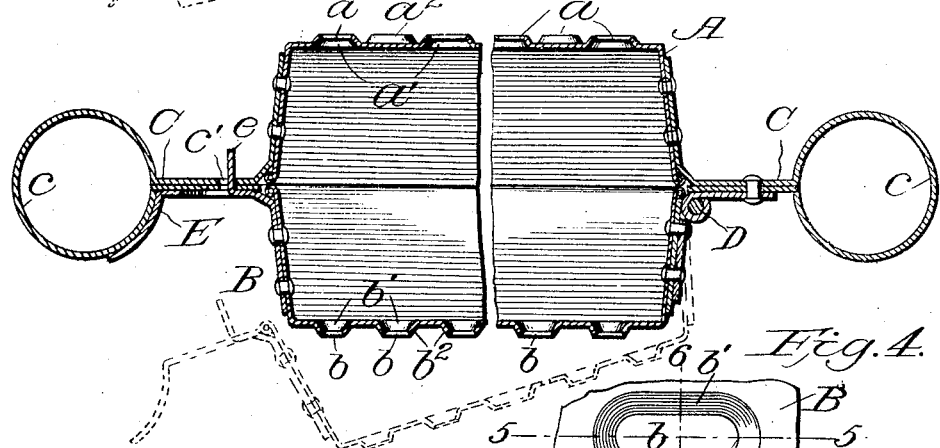
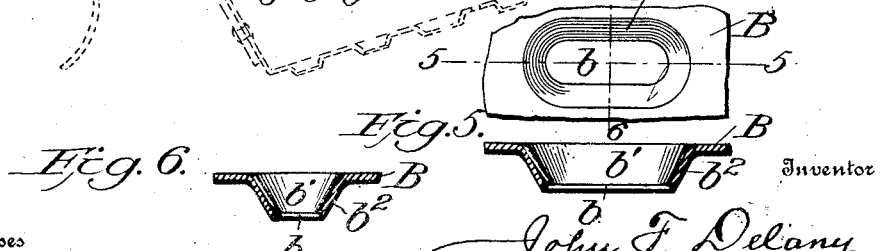

UNITED STATES PATENT OFFICE.

JOHN F. DELANY, OF COLONA STATION, ILLINOIS.

APPARATUS FOR SEPARATING AND GRADING GRAIN.

No. 823,322.

Specification of Letters Patent.

Patented June 12, 1906.

Application filed November 15, 1905. Serial No. 287,509.

*To all whom it may concern:*

Be it known that I, JOHN F. DELANY, of Colona Station, in the county of Henry and State of Illinois, have invented certain new and useful Improvements in Apparatus for Separating and Grading Grain; and I hereby declare that the following is a full, clear, and exact description thereof, reference being had to the accompanying drawings, which form part of this specification.

This invention is a novel apparatus for separating and grading grain and other materials, being particularly designed for separating perfect seed-corn from imperfect and immature grains in mass. The device, as shown, is adapted to be operated by hand much like an ordinary sieve and, as shown, comprises in brief two pan-shaped members of similar size, each having a perforated or screening bottom, one member having round perforations of suitable size to permit the escape of grains, &c., smaller than those desired for seed, while the other pan has oblong perforations which will admit the passage of grains suitable in size and shape for seed and will retain all large imperfectly-formed grains that are unsuitable for seed. In both screens the perforations are conoidal, being larger at their inner ends than at their outer ends, the sloping sides of the perforations being preferably formed by punching or stamping the sheet metal of which the screens are preferably made, so that the openings are funnel-shaped, and their inner sloping sides increase their capacity and prevent irregular-shaped grains from becoming wedged in the openings. One of the members is provided with handles at each end, one of the handles forming part of the hinge connection of the other member therewith, and the other handle forming part of the device for preventing lateral displacement of the members when the apparatus is closed, as hereinafter described. The members will fit together neatly and form closures for each other, and the hand of the operator will hold the sieve closed when in operation.

The accompanying drawings show the present preferred form of the device when intended for manual operation, Figure 1 being a top plan view of the apparatus closed and with the upper or screening sieve partly broken away. Fig. 2 is a side view thereof closed in full lines and partly open in dotted lines. Fig. 3 is an enlarged longitudinal section through the apparatus on line 3 3, Fig. 1, partly broken and showing the device partly opened by dotted lines. Fig. 4 is an enlarged plan view of part of the grading-screen. Fig. 5 is a longitudinal section on line 5 5, Fig. 4; and Fig. 6 is a transverse section on line 6 6, Fig. 4, to show more clearly the form of the openings in the grading-screen.

The apparatus comprises two pan-shaped members A B. The former I term herein a "separating-screen" and the latter a "grading-screen." These members are preferably formed of sheet metal. The bottom of member A is provided with numerous perforations $a$, which are preferably conoidal-shaped and formed by stamping the metal bottom of member A so that the openings are surrounded on the inner side by concavities $a'$ and on the outer side by conoidal-shaped projection $a^2$. The object of this formation is to cause the grain to pocket in the holes and directly pass therethrough, if small enough, without wedging therein, or if too large they will readily pass out; but the concavities will naturally direct the grain to the openings as the screen is shaken and lessen the tendency of the grain to slide over and past the openings, and in practice I find that such a screen has far greater capacity than a flat-surfaced perforated screen and is less liable to clog and can be more readily cleaned.

The member B has a series of oblong perforations $b$ in its bottom, which are surrounded on the inside by oblong concavities $b'$ and on the outside by oblong projections $b^2$, so that the openings are approximately oblong funnels and are adapted to facilitate the separation of the grain, like the openings in member A. The openings $b$, moreover, are arranged lengthwise transversely of member A, so as to facilitate the engagement of perfect grains therewith when the apparatus is vibrated longitudinally. Member A is provided with handles C, which may be made of sheet metal riveted to the ends of member A, as shown, and provided with enlarged handholds $c$ for the convenience of the operator.

Member A is hinged at one end to member B, as shown at D, so that the two members may be opened or closed upon each other. At its free end member B is provided with a hand-piece E, which when the members are closed, as in Figs. 1 and 3, fits against the handle C and will be naturally grasped by the hand of the operator in manipulating the apparatus, and the two members respectively form closures for each other. The hand-piece E is provided with a tongue e, adapted to project through an aperture c' in the adjacent handle C when the members are closed, and thus center the members accurately on each other and prevent lateral displacement thereof while in operation.

Operation: The apparatus is opened by placing it on the floor or other support with member A lowermost. Then member B is raised and a sufficient amount of seed-corn placed in member A. Then member B is lowered and closed upon member A, and the operator shakes them until all the small imperfect grains and impurities have passed out through the openings. Then, without necessarily opening the apparatus, it is turned over so member B is lowermost and shaken to sieve out the perfect seed-corn from the larger and imperfect grains which are retained in the apparatus. Then the sieves may be opened, the imperfect large grains discharged, and the operations repeated on another quantity of grain, and so on until the desired amount of seed has been graded and separated.

The apparatus is simple in construction, practical and efficient in operation, and convenient to handle, and owing to the funnel-shaped openings in the members the screening is effected with rapidity and ease and without clogging. The round perforations in screen A are of slightly-greater diameter than the narrow diameter of the long perforations in screen B. The kernels that are too narrow to be desirable for seed escape through the perforations in screen A, as well as other imperfect kernels. As an example of size the perforations a may be about five-sixteenths of an inch in diameter; but I do not wish to confine myself to any exact size, as different grains require different sizes of perforations. The oblong perforations in screen B are intended to separate the perfect seed from the larger imperfect kernels, these being graded by their thickness, the length of the opening being great enough for any length of kernel.

Having thus described my invention, what I claim as new is—

1. In a grain-sorting apparatus, the combination of a pair of pan-shaped screens, adapted to form a closed receptacle, said screens having conoidal or funnel-shaped openings or perforations, the perforations of one screen being elongated and larger than the perforations in the other, and means for fastening the screens together, substantially as described.

2. In a grain-assorting apparatus, the combination of a pan-shaped member having conoidal-shaped openings, and a similar opposed member having openings of larger diameter, one member forming the closure for the other and adapted to be used successively, substantially as described.

3. In a grain-sorting apparatus, the combination of a pan-shaped screen having conoidal or funnel-shaped perforations in its bottom, and handles attached to its ends; with a similar, but opposite screen having perforations of larger size and hinged at one end to one end of the first screen, and having a hand-piece on its other end adapted to fit against the adjacent handle on the first screen when closed thereagainst, and provided with a finger adapted to engage an opening in said handle to prevent lateral displacement of the screens when closed, substantially as described.

4. The combination in a grain-separating apparatus adapted to be held in and operated by the hands, of a pan-like member having circular openings or perforations in its bottom; with a similar opposed pan-like member having elongated perforations in its bottom larger than the perforations in the first member and connected to said first member so as to form a closed receptacle, substantially as and for the purpose described.

5. The combination in a grain-separating apparatus adapted to be held in and operated by the hands, of a pan-like member having outwardly-projecting funnel-shaped openings in its bottom, and handles attached to the ends of said member; with a similar opposed member having outwardly-projecting openings of larger size, and hinged to said first member so as to form a closed receptacle therewith, said members being usable successively, substantially as described.

6. In a grain-sorting apparatus, the combination of a screen having perforated protuberances in its bottom, and handles attached to its ends; with a similar screen having perforated protuberances of larger size in its bottom, and hinged at one end to one end of the first screen, and having a hand-piece on its other end adapted to fit against the handle on the first screen when the screens are closed, said screens forming a closed receptacle and adapted to be used successively, and means to prevent lateral displacement of the screens when closed, substantially as described.

In testimony that I claim the foregoing as my own I affix my signature in presence of two witnesses.

JOHN F. DELANY.

In presence of—
GEO. EMMERT,
GEORGE ALLEN.